United States Patent [19]

Sata et al.

[11] 4,383,856
[45] May 17, 1983

[54] METHOD FOR MANUFACTURING MULTILAYER HEAD CORE

[75] Inventors: Tekeo Sata; Masayuki Takamura; Tomoo Yamagishi; Toshiharu Hoshi; Kenzaburo Iijima, all of Hamamatsu, Japan

[73] Assignee: Nippon Gakki Seizo Kabushiki Kaisha, Shizuoka, Japan

[21] Appl. No.: 94,363

[22] Filed: Nov. 15, 1979

Related U.S. Application Data

[62] Division of Ser. No. 894,607, Apr. 7, 1978, Pat. No. 4,242,711.

[30] Foreign Application Priority Data

Apr. 13, 1977 [JP] Japan .................................. 52-42436

[51] Int. Cl.³ .............................................. B22F 5/00
[52] U.S. Cl. ............................................ 419/6; 419/10; 419/38
[58] Field of Search ........................ 75/208 R

[56] References Cited

U.S. PATENT DOCUMENTS

| | | | |
|---|---|---|---|
| 2,221,983 | 11/1940 | Mayer et al. | 75/208 R |
| 3,192,086 | 6/1965 | Gyurk | 75/208 R |
| 3,248,214 | 4/1966 | Kroeger et al. | 75/208 R |
| 3,353,932 | 11/1967 | Shanley | 75/208 R |

*Primary Examiner*—Brooks H. Hunt
*Attorney, Agent, or Firm*—Burgess, Ryan & Wayne

[57] ABSTRACT

In a metal-insulator alternate type multilayer head core usable for magnetic sound recording and reproducing, metallic component layers are connected to each other via one or more metallic interconnecting layers passing locally through insulating component layers in order to provide high effective permeability with minimized eddy current loss. In manufacturing, a metal-insulator alternate type multilayer construction including the metallic interconnecting layer or layers is subjected to sintering in order to avoid intermetal separation which might be otherwise caused by cracking in the insulating layers.

9 Claims, 18 Drawing Figures ent layers and a plurality of insulating component layers superimposed to each other in an alternate fashion, the metallic component layers being connected to each other via at least a metallic interconnecting layer.

METHOD FOR MANUFACTURING MULTILAYER HEAD CORE

CROSS-REFERENCE TO RELATED APPLICATION

This is a division of application Ser. No. 894,607, filed Apr. 7, 1978, now U.S. Pat. No. 4,242,711, granted Dec. 30, 1980.

BACKGROUND OF THE INVENTION

The present invention relates to an improved multilayer head core and a method for manufacturing the same, and more particularly relates to improvements in a multilayer head core used for magnetic heads in magnetic sound recording and reproducing devices, magnetic video recording and reproducing devices, and the like, and in a method for manufacturing same.

It is in general required for the magnetic material for head cores to have high magnetic permeability and high abrasion resistance accompanied by reduced eddy current loss in the high frequency range of the electric current.

However, relatively high permeability of such material leads to increased eddy current loss in the high frequency range when such material is used for head cores while resulting in lower effective permeability.

In order to avoid such lowering in effective permeability, it is proposed to superimpose a plurality of thin layers of the magnetic material such as permalloy and a plurality of insulating material layers alternately to each other to obtain multilayer head cores. For this purpose, the conventional magnetic alloy material such as permalloy is first subjected to cold working to produce thin layers of head core shape, and a plurality of such thin layers are bonded together by adhesive with insulating material layers interposed therebetween to obtain a head core structure.

Recently, the performance requirements for the head core have become higher and higher and new magnetic alloy materials such as sendust and alperm alloys are spotlighted in the possible use to the head cores. These new alloys, indeed, have excellent characteristics as magnetic head core materials, but low workability of these alloys makes it very difficult to work the material alloys into thin layers with low manufacturing cost.

SUMMARY OF THE INVENTION

It is an object of the present invention to provide a multilayer head core having high effective permeability with relatively small eddy current loss in the high frequency range.

It is another object of the present invention to provide a method for manufacturing such an excellent multilayer head core even from difficult to workable magnetic materials such as sendust and alperm alloys which are quite unsuited for cold working.

In accordance with the present invention, the multilayer head core includes a plurality of metallic component layers and a plurality of insulating component layers superimposed to each other in an alternate fashion, the metallic component layers being connected to each other via at least a metallic interconnecting layer.

In accordance with the manufacturing method of the present invention, a plurality of metallic material layers and a plurality of insulating material layers are superimposed and secured to each other in an alternate fashion, the powdery metallic material layers are connected to each other via at least an interconnecting powdery metallic material layer, both the metallic and insulating material layers are compacted to form a compressed multilayer construction, and sintering is thereafter applied to the compressed multilayer construction.

DESCRIPTION OF THE PREFERRED EMBODIMENTS

Figure 1:
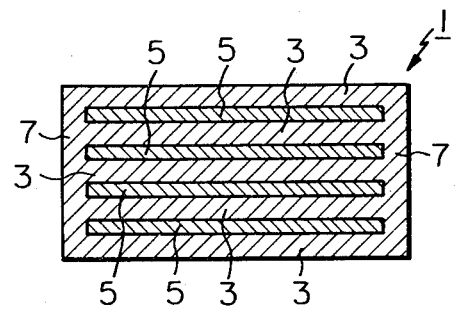
FIG. 1 is a side sectional view of one embodiment of the multilayer head core in accordance with the present invention.

In order to manufacture head cores of excellent characteristics, particularly from hard-to-work magnetic alloy materials, various tests have been conducted and as a result the application of powder metallurgy comes out to be effective.

In the application of powder metallurgy to the manufacture of laminated head cores, following steps are selectively available: powdery metallic materials and powdery insulating materials are superposed to one another in an alternate fashion, such laminated materials are compacted to form a compressed multilayer construction, and the compressed multilayer construction is subjected to sintering; each of the powdery metallic and insulating material layers is pre-compacted before another layer is superposed thereon, such layers are laminated to form a multilayer construction, and the multilayer construction is subjected to sintering; and such powdery materials are pressed to obtain a number of separate layers, the separate layers are superimposed one another to form a multilayer construction, and the multilayer construction is pressed and compacted and then is subjected to sintering. As the insulating material is required to have sufficient resistance against head application during the sintering process, it is quite impossible to use popular insulating materials such as synthetic resins or rubbers.

As a substitute, it is proposed to use such insulating materials as alumina, magnesia and silica glass. In this connection, however, the sintering temperatures for such oxides are relatively high and in a range from 1,700° to 3,000° C. whereas the sintering temperatures of the magnetic alloys are relatively low and generally in a range from several hundreds to 1,500° C.

Therefore, when sintering is carried out at the sintering temperatures of the alloys, oxide powders in the insulating layers cannot be well sintered. Only mechanical coupling is attained between the oxide powders in the insulating layers and between the oxide powder layers (insulating layers) and the metal layers. This weak coupling leads to serious problems such as development of cracks in the oxide powder layers and separation between the metal layers.

On the contrary, when sintering is carried out at the sintering temperature of the insulating materials, metallic powders in the alloy layers start to melt so that the multilayer construction cannot preserve its shape. For this reason, there is no other way but to employ the sintering temperature of the alloys in order to carry out sintering of the multilayer construction.

This solution is still accompanied by another trouble. Thermal expansivity of the above-described oxides is relatively small being in a range from $0.1 \sim 4 \times 10^{-6}/°$ C. whereas the thermal expansivity of the above-described alloys is relatively large being in a range from 5 to $30 \times 10^{-6}/°$ C. This big difference in the thermal expansivity between both materials tends to cause development of cracks in the insulating layers in the multilayer construction during cooling after the sintering. Development of such cracks in the insulating layers inevitably induces separation between the alloy layers.

Elimination of any trouble mentioned above has resulted in the following embodiments.

An embodiment of the multilayer head core in accordance with the present invention is shown in FIG. 1, in which the head core 1 is comprised of a plurality of metallic component layers 3 and a plurality of insulating component layers 5 which are alternately superimposed to each other. The metallic component layers 3 are securely inter-connected in one body to each other via a metallic interconnecting layer 7 which runs across the extending direction of the metallic component layers 3 in order to internally embrace the component layers 3 and 5. That is, when the component layers 3 and 5 take the form of thin circular discs or thin rings, the interconnecting layer 7 is formed on the outer peripheral portion of the head core 1. However, when the component layers 3 and 5 take the form of the thin rings, the interconnecting layer 7 may be formed on the inner peripheral portion, too. In this case, an interconnecting layer 7 may be formed on the inner peripheral portion only. In a further variant, the interconnecting layer 7 may fully fill the center portion of the head core 1. It is only required that the metallic component layers 3 alternately sandwiching the insulating component layers 5 are securely interconnected in one body to each other via the interconnecting layer or layers 7.

The present invention is applicable to head cores of any magnetic metallic materials, but is most advantageously applied to ones of hard-to-work magnetic metallic materials such as sendust and alperm alloy materials. Herein, the term "hard-to-work magnetic metallic materials" means the magnetic metallic materials which are relatively easily subjected to hot working but are relatively hardly subjected to cold working. Here, the sendust alloy is defined as an alloy consisting of 0.001 to 8.0 wt.% (percent by weight) of one or more elements chosen from a group composed of 0.01 to 6.0 wt.% of Nb, 0.1 to 5.0 wt.% of Mo, 0.1 to 5.0 wt.% of Ti, 0.1 to 7.0 wt.% of Cr, 0.1 to 5.0 wt.% of V, 0.1 to 7.0 wt.% of Ni, 0.05 to 6.0 wt.% of Cu, 0.1 to 5.0 wt.% of W, 0.1 to 5.0 wt.% of Ta, 0.1 to 5.0 wt.% of Ge, 0.1 to 5.0 wt.% of Hf, 0.1 to 5.0 wt.% of Zr, 0.01 to 3.0 wt.% of rare earth element or elements, 0.1 to 5.0 wt.% of Mn, 0.001 to 0.5 wt.% of P, 0.01 to 5.0 wt.% of Y, 0.001 to 0.5 wt.% of B, 0.1 to 5.0 wt.% of Ti and 0.1 to 5.0 wt.% of Pb; 3 to 8 wt.% of Al; 3 to 12 wt.% of Si; and remaining percent by weight of Fe. The alperm alloy consists of 16 percent by weight of Al and the balance of Fe. The sendust alloy as well as alperm alloy is known as a magnetic material having high initial and maximum permeabilities, extremely high hardness and excellent abrasion resistance.

The insulating layers 5 are made of materials having sufficient thermal resistance at the sintering temperature of the magnetic metallic material used for the metallic component layers 3. For example, oxides such as alumina, magnesia and silica glass can be advantageously used in the present invention.

The interconnecting layer 7 may be made of a metallic material either same (or similar) to or different from that used for the metallic component layers 3. It is only required for the metallic material or materials for both layers 3 and 7 that metallic powder particles should be strongly bonded to each other as a result of sintering, given no ill physical and chemical influences upon the resultant metallic layers during actual use of the head core and form no bar to smooth working of the head core. In one example, the component layers may be made of sendust alloy powder and the interconnecting layers are made of iron powder.

Figure 2A:
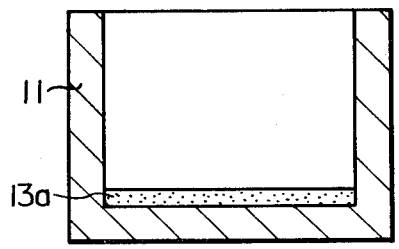
FIGS. 2A through 2C are side sectional views for showing operational steps of one embodiment of the method for manufacturing the head core shown in FIG. 1, FIGS. 3A through 3C are side sectional views for showing operational steps of another embodiment of the method for manufacturing the head core shown in FIG. 1, FIGS. 4A and 4B are side sectional views for showing operational steps of the other embodiment of the method for manufacturing the head core shown in FIG. 1, FIGS. 5A and 5B are side sectional and explanatory plan views of a head core test piece used in examples in which manufacturing was carried out in accordance with the present invention.
Figure 2B:
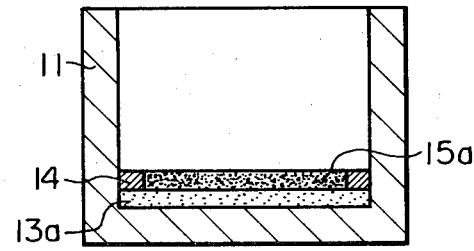
Figure 2C:
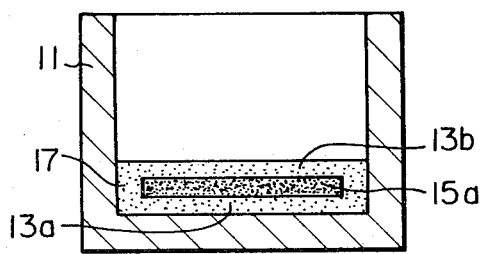

One embodiment of the method for manufacturing the head core of the above-described construction in accordance with the present invention is shown in FIGS. 2A through 2C, in which the head core to be manufactured is assumed to have a column shape. A cylindrical mould 11 closed at the bottom is prepared for press. Metallic material powder is dispersed and filled in the mould 11 to a prescribed depth in order to form the first metallic powdery layer 13a as shown in FIG. 2A. Next, an annular mask 14 is placed on the top surface of the first metallic powdery layer 13a. Preferably, the outer diameter of the mask 14 is equal to the inner diameter of the cylindrical mould, the inner diameter of the mask 14 is equal to the outer diameter of the later described first insulating layer and the thickness of the mask 14 is equal to the depth of the first insulating layer. After emplacement of the mask 14, insulating material powder is dispersed and filled in the space defined by the mask 14 to a prescribed depth, i.e. the thickness of the mask 14, in order to form the first insulating powdery layer 15a as shown in FIG. 2B. After removal of the annular mask 14, the metallic material powder is again dispersed and filled in the mould 11 to a prescribed depth in order to form the second metallic powdery layer 13b. By this filling, the annular space previously occupied by the annular mask 14 is filled with the metallic material powder, also. Thus, the first and second metallic powdery layers 13a and 13b are interconnected to each other via a cylindrical metallic powdery layer 17 as shown in FIG. 2C while sandwiching the first insulating powdery layer 15a.

By repeating the above-described process, a multilayer intermediate construction is formed in the cylindrical mould 11 in which a plurality of flat insulating powdery layers and a plurality of flat metallic powdery layers are alternately superimposed to each other while the latter being mutually interconnected in one body to each other by the cylindrical metallic powdery layer. After the above-described superimposition is complete, a suitable press such as the known hydrostatic press is applied utilized to apply pressure to the multilayer intermediate construction within the mould 11 in order to obtain a multilayer construction usable for the magnetic head core shown in FIG. 1.

Figure 3A:
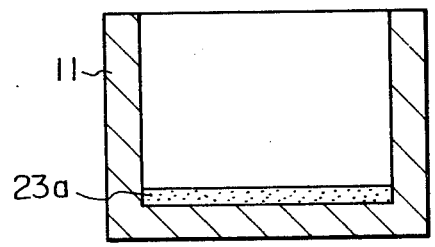
Figure 3B:
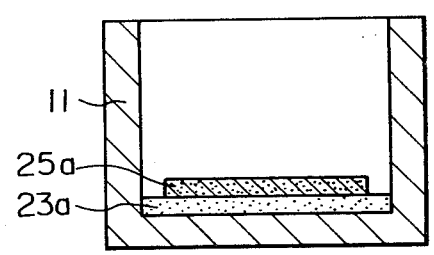
Figure 3C:
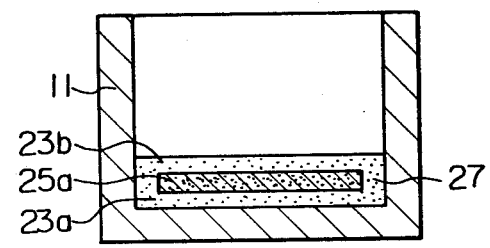

A modified embodiment of the manufacturing method in accordance with the present invention is shown in FIGS. 3A through 3C, in which a like cylindrical mould 11 for press is employed. In this case, formation of the flat metallic powdery layers and the cylindrical metallic powdery layer is substantially similar to that imployed in the preceding embodiment. Metallic material powder is dispersed and filled in the mould 11 to a prescribed depth in order to form the first metallic powdery layer 23a shown in FIG. 3A. In this case, no mark is used for building up the insulating layer. As a substitute, insulating material plates are separately shaped by suitable preparatory press. An insulating material plate 25a is placed in position on the top surface of the first metallic powdery layer 23a as shown in FIG. 3B. After correct emplacement of the first insulating material plate 25a, the metallic material powder is again dispersed and filled in the mould 11 to a prescribed depth in order to form the second metallic powdery layer 23b. By this filling, the annular space surrounding the first insulating material plate 25a is filled with the metallic material powder also. Thus, the first and second metallic powdery layers 23a and 23b are interconnected to each other via a cylindrical metallic powdery layer 27 as shown in FIG. 3C while sandwiching the first insulating material plate 25a.

By repeating the above-described process, a multilayer intermediate construction is formed in the cylindrical mould 11 in which a plurality of flat insulating material plates and a plurality of flat metallic powdery layers are alternately superimposed to each other while the latter being mutually interconnected in one body to each other by the cylindrical metallic powder layer. After the above-described superimposition is complete, suitable press such as the known hydrostatic press is applied to the multilayer intermediate construction within the mould in order to obtain a multilayer construction usable for the magnetic head core shown in FIG. 1. The press may be applied after each time filling of the metallic material powder.

Figure 4A:
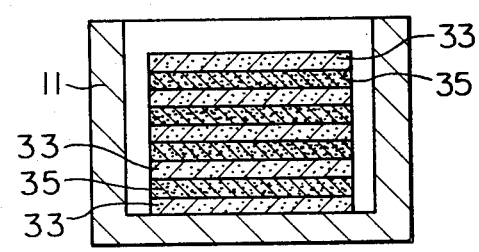
Figure 4B:
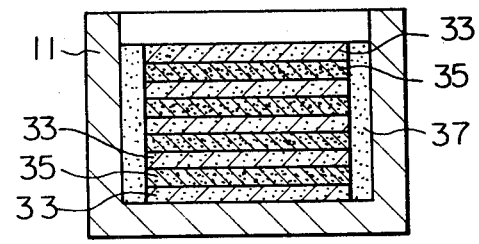

A further modified embodiment of the manufacturing method in accordance with the present invention is shown in FIGS. 4A and 4B, in which a like cylindrical mould 11 for press is employed. In this case, a multilayer intermediate construction is separately shaped by suitable preparatory press. This multilayer intermediate construction includes a plurality of metallic material layers 33 and a plurality of insulating material layers 35 superimposed and bonded in one body to each other in an alternate fashion. The multilayer intermediate construction is placed in position in the mould as shown in FIG. 4A while leaving a cylindrical space therearound. Next, the metallic material powder is dispersed and filled in the above-described cylindrical space to the level of the top surface of the multilayer intermediate construction. Thus, the metallic material layers 33 in the multilayer intermediate construction are interconnected to each other via a cylindrical metallic powdery layer 37 as shown in FIG. 4B. After the above-described filling is complete, a suitable press such as the known hydrostatic press is employed in order to obtain a multilayer construction usable for the magnetic head core shown in FIG. 1.

For pressing of the multilayer intermediate construction, the known hydrostatic press employing a rubber press is advantageously utilized. In this case, it is recommended to repeat the press for several times and, more advantageously, employ intermediate annealing between presses in order to obtain a compressed multilayer construction of extremely high density.

Next, the compressed multilayer construction is subjected to sintering. The sintering conditions such as sintering temperature and sintering time are chosen in reference to the physical characteristics of the material metallic powder. For example, when Sendust alloy is used as the material metal, the sintering temperature should be in a range from 900° to 1,350° C. and the sintering time in a range from 30 to 600 minutes. As the environmental gas during sintering, highly vacuum air of $10^{-4}$ Hg. or lower, hydrogen gas having a dew point of $-30°$ C. or lower, or inert gas having a dew point of $-35°$ C. or lower is preferably used.

In the case of using alperm alloy as the material metal, the sintering temperature should preferably be in a range from 800° to 1,400° C. and he sintering time in a range from 30 to 600 minutes. Hydrogen gas of a dew point of $-30°$ C. or lower or inert gas of a dew point of $-35°$ C. or lower may preferably used for the environmental gas at sintering.

When the sintering temperature is lower than 800° C., no sintering can be carried out ideally. Any sintering temperature exceeding 1,400° C. may cause melting of the component layers. When the dew points of the above-described gases exceed the above-described limits, possible oxidization of the material seriously lowers magnetic characteristics of the head core obtained.

Sintering time shorter than 30 minutes assures no successful sintering whereas that longer than 600 minutes is economically inadvantageous.

By employment of the sintering, particles of the metallic powder or powders are sintered and bonded in one body to each other. Thanks to such fortified bonding between the metallic particles, no separation occurs between the metallic component layers even when any crack develops in the insulating component layers during sintering, cooling after sintering and later-staged grinding and abrasing.

The following examples are illustrative of the present invention but are not to be construed as limiting the same.

EXAMPLE 1.

A sendust alloy consisting of 9.7 wt.% of Si, 5.5 wt.% of Al, 1.0 wt.% of ti and remaining percent by weight of Fe was used for the metallic material powder whereas silica ($SiO_2$) powder was used for the insulating material. A cylindrical metallic mould closed at the bottom was used for pressing with an outer and inner annular masks for formation of the insulating powdery layers. Both powders were filled alternately with application of press at each filling. The obtained compressed multilayer construction has a cylindrical shape of 6 mm. inner diameter and 10 mm. outer diameter and includes four metallic powdery layers and three insulating powdery layers alternately superimposed to each other.

Figure 5A:
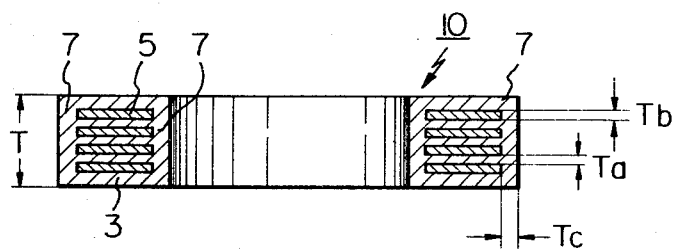
Figure 5B:
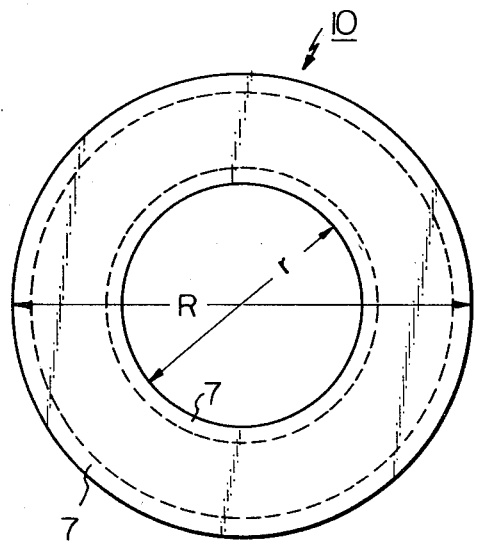

The compressed multilayer construction was then subjected to sintering at 1,250° C. for 160 minutes within hydrogen gas having a dew point of −40° C. or lower. The test piece, i.e. the multilayer construction, so obtained is shown in FIGS. 5A and 5B, which has a culindrical shape of the following particulars.

Inner diameter r: 6 mm.
Outer diameter R: 10 mm.
Thickness of each metallic component layer 3. Ta:0.3 mm.
Thickness of each insulating component layer 5. Tb:0.05 mm.
Thickness of each metallic interconnecting layer 7. Tc:0.1 mm.
Thickness of the multilayer construction 10. T:1.35 mm.

Figure 6:
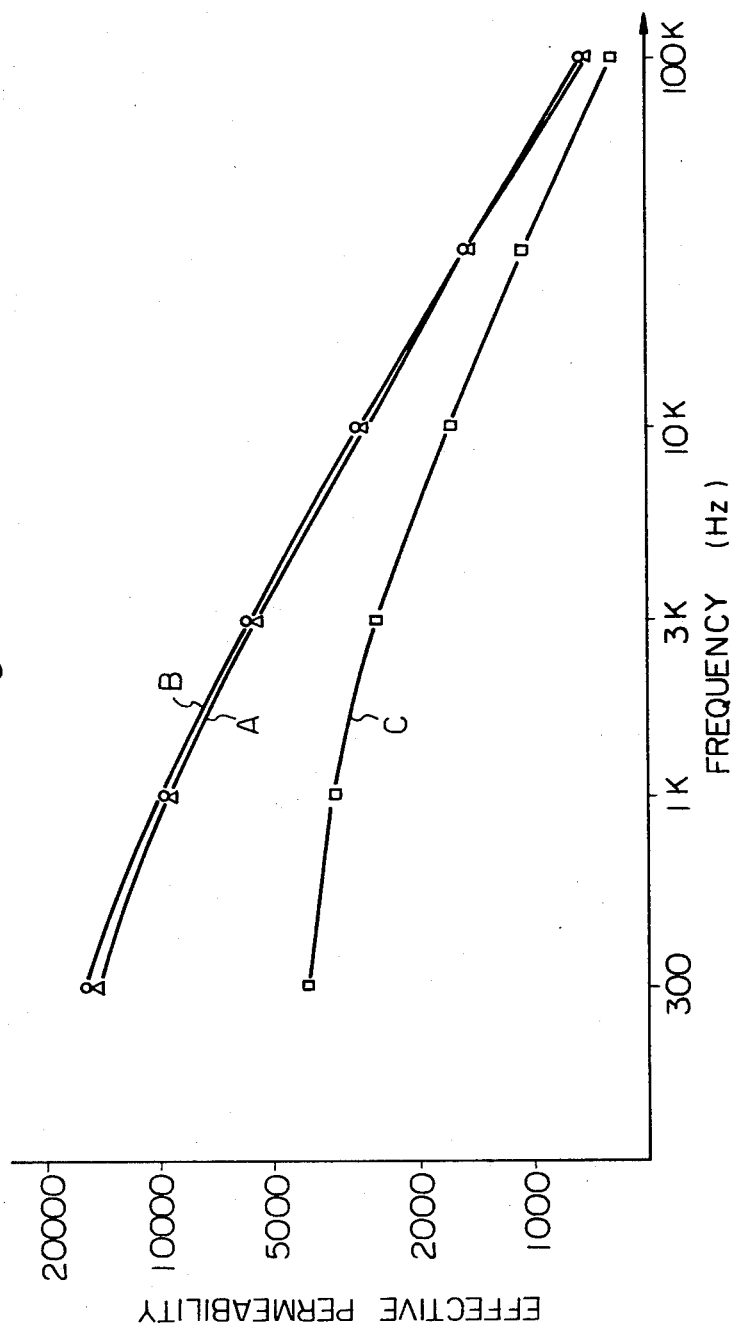
FIG. 6 is a graph for showing the relationship between the effective permeability of the test piece and the frequency of the electric current applied to the test pieces obtained in various examples in which cendust alloy is used for metallic component layers.

Frequency of the electric quantity to be applied to the above-described multilayer construction test piece was changed from 300 Hz. to 100 KHz and the measured values of the effective permeability are shown with a curve A in FIG. 6.

EXAMPLE 2.

Figure 7:
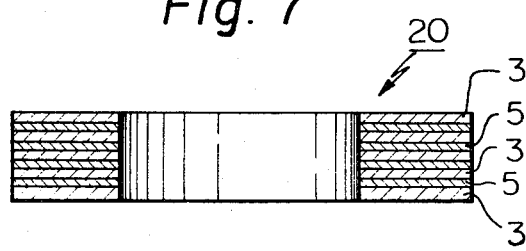
FIG. 7 is a side sectional view of a head core test piece used in examples with which the head core test piece of the present invention is compared.

Like in Example 1, a cylindrical test piece, i.e. a multilayer construction, as shown in FIG. 7 was prepared from similar metallic material powder and insulating material powder with only exception that no mask was used for formation of the insulating powdery layer. The particulars of this multilayer construction test piece were quite same with those of the test piece used in Example 1 but this multilayer construction 20 lacks in the metallic layer or layers interconnecting the metallic component layers. In other words, the metallic component layers 3 were isolated from each other by the intervening insulating component layers 5. Similar electric test was applied to this test piece and the measured values of the effective permeability are shown with a curve B in FIG. 6.

EXAMPLE 3.

Using the metallic material powder alone used in Example 1, a like cylindrical multilayer construction test piece was prepared. The particulars of the test piece are almost same with those of the test piece used in Example 1 with exceptions that no insulating component layer was included and the total thickness of the test piece was 1.2 mm. Similar electric test was applied to this test piece and the measured values of the effective permeability are shown with a curve C in FIG. 6.

The results in Examples 1 through 3 are numerically shown in Table 1.

TABLE 1

| | Effective permeability Frequency in KHz | | | | | |
|---|---|---|---|---|---|---|
| | 0.3 | 1 | 3 | 10 | 30 | 100 |
| Example 1 | 14,000 | 9,600 | 5,900 | 3,000 | 1,350 | 750 |
| Example 2 | 15,000 | 9,800 | 6,100 | 3,200 | 1,400 | 800 |
| Example 3 | 3,500 | 3,000 | 2,500 | 1,800 | 1,100 | 680 |

It is clearly learned from FIG. 6 that the lowering in the effective permeability of the test piece in Example 1 (present invention) from that of the test piece in Example 2 is extremely small whereas the effective permeability of the test piece in Example 1 (present invention) is remarkably higher than that of the test piece in Example 3.

EXAMPLE 4.

Figure 8:
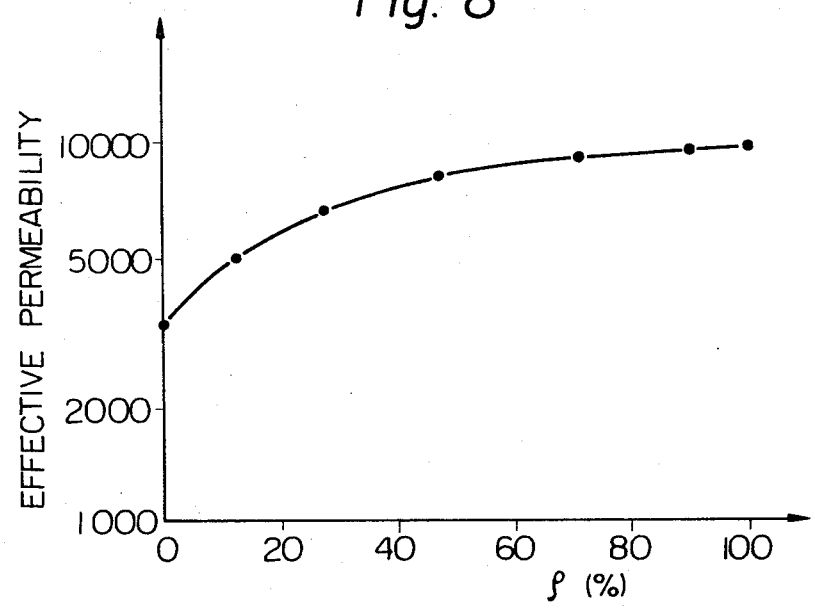
FIG. 8 is a graph for showing the relationship between the effective permeability and the cross-sectional surface ratio in percent of the insulating component layers in a test piece at a fixed frequency of the electric current applied to the test piece, cendust alloy being used for metallic component layers.

A number of multilayer construction test pieces were prepared in a manner substantially similar to that employed in Example 1 with only exception that the thickness Tc of each of the metallic interconnecting layers 7 was changed from 0 to 2 mm. Electric current of 1 KHz frequency was applied to the test pieces and the measured values of the effective permeability are shown in FIG. 8, in which the cross-sectional surface ratio $p$ in percent of the insulating component layers to the total cross-sectional surface area of the test piece is taken on the abscissa.

The above-described result is numerically shown in Table 2.

TABLE 2

| p | Effective permeability |
|---|---|
| 0 | 3,500 |
| 13 | 5,000 |
| 28 | 6,500 |
| 47 | 8,000 |
| 72 | 9,000 |
| 92 | 9,600 |

As is clear from these representations, the effective permeability of the test piece is in a range from 3,000 to 4,000 when the surface ratio $p$ is zero, i.e. when no insulating component layer is included in the test piece. However, whenthe surface ratio $p$ exceeds 50, i.e. when the cross-sectional surface ratio of the metallic interconnecting layer falls short of 50%, the effective permeability of the test piece becomes 8,000 or higher. Further, when the surface ratio $p$ exceeds 70, i.e. when the cross-sectional surface ratio of the metallic interconnecting layer falls short of 30%, the effective permeability of the test piece becomes 9,000 or higher. Therefore, despite the presence of the metallic interconnecting layer between the metallic component layer sandwiching the insulating component layer, increase in eddy current loss can be successfully avoided in order to obtain very high effective permeability by decreasing cross-sectional surface ratio of the metallic interconnecting layer or layers.

Figure 9:
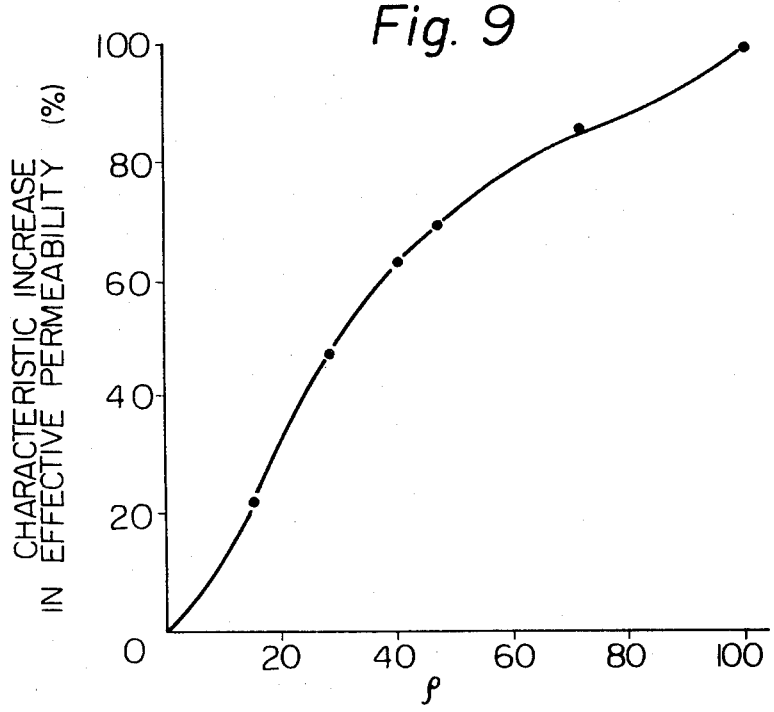
FIG. 9 is a graph for showing the relationship between the characteristic increase in effective permeability and the cross-sectional surface ratio in percent of the insulating component layers in a test piece at a fixed frequency of the electric current applied to the test piece, sendust alloy being used for metallic component layers.

In addition to the foregoing analysis, the relationship between the cross-sectional surface ratio ρ and the characteristic increase in effective permeability is shown in FIG. 9. Here, the characteristic increase in effective permeability is defined by the following formula.

$$\frac{M_x - M_0}{M_{100} - M_0} \times 100 \, (\%)$$

$M_{100}$; Effective permeability when the ratio ρ is 100.
$M_0$; Effective permeability when the ratio ρ is 0.
$M_x$; Effective permeability when the ratio ρ is x.

From FIG. 9, it is clear that, as concerns sendust alloy, the effective permeability is acceptable when the ratio ρ is 30 or larger except for 100, the effective permeability being 6,600 when the ratio ρ is 30.

EXAMPLE 5.

Instead of the sendust alloy used in Example 1, the alperm alloy consisting of 16 wt.% of Al and 84 wt.% of Fe was used for the metallic material powder and a compressed maltilayer construction was prepared in a manner substantially similar to that employed in Example 1. Sintering was carried out at 1,250° C. for 120 minutes within hydrogen gas of a dew point −35° C. The obtained cylindrical multilayer construction test piece has two metallic component layers of 0.3 mm. thickness for each and an insulating component layer of 0.05 mm. thickness, total thickness of the test piece being accordingly 0.65 mm. The cross-sectional surface ratio ρ in percent of the insulating component layers was 94.

Figure 10:
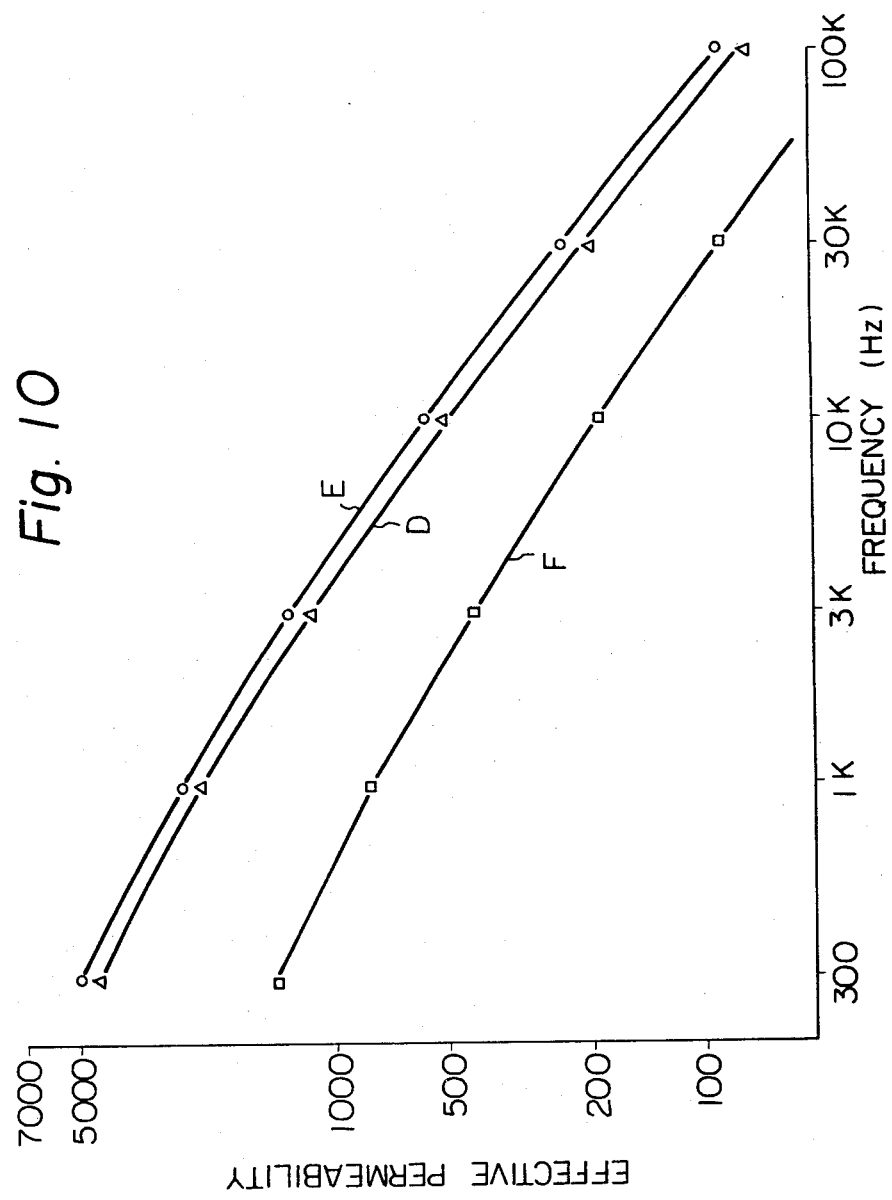
FIG. 10 is a graph for showing the relationship between the effective permeability of the test piece and the frequency of the electric current applied to the test pieces in various examples in which alperm alloy is used for metallic component layers.

Electric test was applied to the test piece in a manner similar to those employed in Examples 1 through 3 and measured values of the effective permeability are shown with a curve D in FIG. 10.

EXAMPLE 6

Using the materials employed in Example 5, a test piece was prepared which includes, just like in Example 2, no metallic interconnecting layer. Result of the electric test is shown with a curve E in FIG. 10.

EXAMPLE 7

Using the alperm alloy employed in Example 5, a test piece was prepared which includes, just like in Example 3, neither metallic interconnecting layers nor insulating component layer. Result of the electric test is shown with a curve F in FIG. 10.

The results in Examples 5 through 7 are numerically shown in Table 3.

TABLE 3

| | Effective permeability Frequency in KHz | | | | | |
|---|---|---|---|---|---|---|
| | 0.3 | 1 | 3 | 10 | 30 | 100 |
| Example 5 | 4,600 | 2,400 | 1,180 | 510 | 200 | 80 |
| Example 6 | 5,000 | 2,600 | 1,340 | 560 | 230 | 88 |
| Example 7 | 1,480 | 820 | 420 | 190 | 89 | 38 |

As is clear from these representation, the lowering in the effective permeability of the test piece in Example 5 (present invention) from that of the test piece in Example 6 is extremely small whereas the effective permeability of the test piece in Example 5 (present invention) is remarkably higher than that of the test piece in Example 7, in the case of alperm alloy also.

EXAMPLE 8

Figure 11:
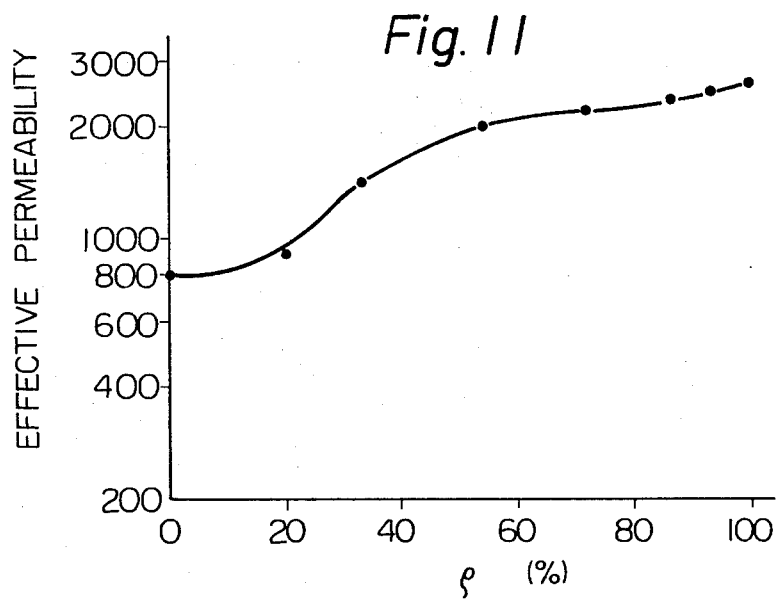
FIG. 11 is a graph for showing the relationship between the effective permeability and the cross-sectional surface ratio in percent of the insulating component layers in a test piece at a fixed frequency of the electric current applied to the test piece, alperm alloy being used for metallic component layers.

Just like in Example 4, electric current of 1 KHz frequency was applied to test pieces in which the thickness Tc of each of the metallic interconnecting layers 7 was changed from 0 to 2 mm. The measured values of the effective permeability are shown in FIG. 11, in which the cross-sectional surface ratio ρ of the insulating component layers to the total cross-sectional surface area of the test piece is taken on the abscissa.

The above-described result is numerically shown in Table 4.

TABLE 4

| ρ | Effective permeability |
|---|---|
| 0 | 820 |
| 20 | 900 |
| 33.99 | 1,400 |
| 54 | 2,000 |
| 70.3 | 2,200 |
| 87.76 | 2,300 |

As is clear from these representations, the effective permeability of the test piece is about 800 when the surface ratio ρ is zero, i.e. when no insulating component layer is included in the test piece. However, when the surface ratio ρ exceeds 50, i.e. when the cross-sectional surface ratio of the metallic interconnecting layer falls short of 50%, the effective permeability of the test piece becomes 1,800 or higher. Further, when the surface ratio ρ exceeds, i.e. when the cross-sectional surface ratio of the metallic interconnecting layer falls short of 30%, the effective permeability of the test piece becomes 2,200 or higher. Therefore, despite the presence of the metallic interconnecting layer between the metallic component layers sandwiching the insulating component layer, increase in eddy current loss can be successfully avoided in order to obtain very high effective permeability by decreasing cross-sectional surface ratio of the metallic interconnecting layer or layers, in the case of alperm alloy also.

Figure 12:
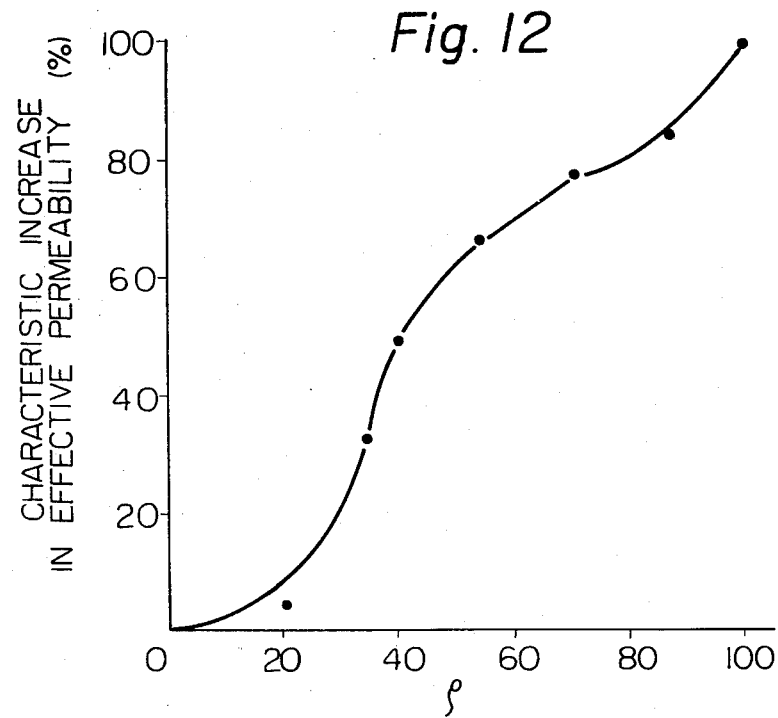
FIG. 12 is a graph for showing the relationship between the characteristic increase in effective permeability and the cross-sectional surface ratio in percent of the insulating component layers in a test piece at a fixed frequency of the electric current applied to the test piece, alperm alloy being used for metallic component layers.

The relationship between the characteristic increase in effective permeability and the cross-sectional surface ratio ρ is shown in FIG. 12 in which it is clear that, as concerns alperm alloy, the effective permeability is acceptable when the ratio ρ is 40 or larger except for 100, the effective permeability being 1,700 when the ratio is 40.

From the results of the various tests, it is learned in general that the effective permeability is acceptable when the cross-sectional surface ratio ρ in percent of the insulating component layers is 40 or larger except for 100.

In accordance with the present invention, separation of the metallic component layers during the manufacturing and/or the later-staged processes can be successfully avoided without causing any substantial increase in eddy current loss.

We claim:
1. A method for manufacturing a multilayer head core comprising:
preparing a compressed multilayer construction which includes a plurality of metallic powdery layers, a plurality of insulating layers superimposed with said metallic powdery layers in an alternate fashion and at least an interconnecting metallic powdery layer locally connecting said metallic powdery layers to each other, and subjecting said compressed multilayer construction to sintering at a temperature sufficient to sinter said metallic powdery layer but insufficient to melt the same, whereby said interconnecting metallic powdery layer adds mechanical strength to said construction and at least reduces cracking due to differential thermal expansion.

2. A method for manufacturing a multilayer head core as claimed in claim 1 in which the step of said preparing includes dispersing and filling metallic material powder to a prescribed depth in a given mould in order to form the first metallic powdery layer, locally covering the top surface of said first metallic powdery layer with at least a mask, dispersing and filling insulating material powder to a prescribed depth in said mould to form the first insulating powdery layer, removing said mask, dispersing and filling metallic material powder to a prescribed depth in said mould in order to form the second metallic powdery layer, repeating the above-described process in order to form a multilayer intermediate construction of a prescribed design in said mould, and subjecting said multilayer intermediate construction to pressure.

3. A method for manufacturing a multilayer head core as claimed in claim 1 in which the step of said preparing includes, dispersing and filling metallic material powder to a prescribed depth in a given mould in order to form the first metallic powdery layer, emplacing an insulating material plate on the top surface of said first metalling powdery layer, the effective cross-sectional surface area of said plate being smaller than that of said mould, dispersing and filling metallic material powder to a prescribed depth in said mould in order to form the second metallic powdery layer, repeating the above-described process in order to form a multilayer intermediate construction of a prescribed design in said mould, and subjecting said multilayer intermediate construction to press.

4. A method for manufacturing a multilayer head core as claimed in claim 1 in which the step of preparing includes, emplacing a multilayer intermediate construction including alternately superimposed metallic material layers and insulating material layers in a given mould, the effective cross-sectional surface area of said construction being smaller than that of said mould, dispersing and filling metallic material powder into spaces in said mould unoccupied by said construction, and applying press to materials in said mould.

5. A method for manufacturing a multilayer head core as claimed in claim 1 in which said sintering is carried out at a temperature in a range from 800° to 1,400° C.

6. A method for manufacturing a multilayer head core as claimed in claim 1 in which said sintering is carried out for a period in a range from 30 to 600 minutes.

7. A method as claimed in claim 1 in which said sintering is carried out within an environmental gas chosen from a group consisting of hydrogen gas having a dew point of $-30°$ C. or lower, vacuum air of $10^{-4}$ mm. Hg or higher and inertgas having a dew point of $-35°$ C. or lower.

8. A method for manufacturing a multilayer magnetic head core, comprising the steps of:

providing a stack comprising a plurality of alternating parallel layers of insulating material and compressed powdered particles of a low ductility metallic high permeability magnetic alloy material;

disposing particles of a powdered metallic material around the edges of said insulating layers and extending between said magnetic layer;

compressing said layers and metallic particles to form a compressed multilayer construction; and heating said compressed multilayer construction at a temperature sufficient to sinter said particles to each other, said temperature being below the melting point of said magnetic material, whereby the sintered particles of a powdered metallic material around the edges of said insulating layers and extending between said magnetic layers add mechanical strength to said multilayer magnetic head core and at least reduce cracking due to differential thermal expansion.

9. The method of claim 1, 2, 3, 4, 5, 6, 7 or 8, wherein the metallic powdery layer locally connecting said metallic powdery layers to each other encloses the insulating layers within the multilayer construction.

* * * * *